(12) United States Patent
Mazzoni (10) Patent No.: US 10,344,532 B2
(45) Date of Patent: Jul. 9, 2019

(54) TUBULAR ACTUATING MECHANISM FOR ROLL-TYPE CLOSURES

(71) Applicant: Gaposa srl, Fermo (IT)

(72) Inventor: Alessandro Mazzoni, Fermo (IT)

(73) Assignee: Gaposa srl, Fermo (IT)

( * ) Notice: Subject to any disclaimer, the term of this patent is extended or adjusted under 35 U.S.C. 154(b) by 217 days.

(21) Appl. No.: 14/908,762

(22) PCT Filed: Sep. 5, 2014

(86) PCT No.: PCT/EP2014/068950
§ 371 (c)(1),
(2) Date: Jan. 29, 2016

(87) PCT Pub. No.: WO2015/036328
PCT Pub. Date: Mar. 19, 2015

(65) Prior Publication Data
US 2016/0160560 A1   Jun. 9, 2016

(30) Foreign Application Priority Data

Sep. 11, 2013   (IT) .............................. MC2013A0052

(51) Int. Cl.
*F16H 1/30* (2006.01)
*E06B 9/72* (2006.01)

(52) U.S. Cl.
CPC ............. *E06B 9/72* (2013.01); *F16H 1/30* (2013.01); *E06B 2009/725* (2013.01)

(58) Field of Classification Search
CPC .......... F16H 1/30; E06B 2009/725; E06B 9/72
See application file for complete search history.

(56) References Cited

U.S. PATENT DOCUMENTS

| 1,276,855 | A | * | 8/1918 | Apple | F16H 1/30 |
| | | | | | 475/333 |
| 4,777,847 | A | * | 10/1988 | Pickles | F16H 1/30 |
| | | | | | 475/149 |
| 5,387,162 | A | * | 2/1995 | Yang | F16H 1/30 |
| | | | | | 475/333 |
| 2010/0320855 | A1 | * | 12/2010 | Lagarde | E06L 39/72 |
| | | | | | 310/77 |

(Continued)

FOREIGN PATENT DOCUMENTS

| CH | 707435 A1 * | 7/2014 | ............. B62D 5/008 |
| CN | 2585960 Y | 11/2003 | |
| CN | 2692908 Y | 3/2004 | |

(Continued)

OTHER PUBLICATIONS

Nice, "How Gears Work" retrieved from www.science-howstuffworks.com (Year: 2010).*

(Continued)

*Primary Examiner* — Stacey A Fluhart
(74) *Attorney, Agent, or Firm* — Renner, Otto, Boisselle & Sklar, LLP (57) ABSTRACT

The present invention relates to a tubular actuating mechanism (10) for roll-type closures, comprising an electric motor (30) and a gear reduction assembly (100) of the epicyclic gearing type comprising a rotatable sun gear (110), one or more rotatable planet gear (s) (130) and an outer ring gear (132).

14 Claims, 4 Drawing Sheets

(56) References Cited

U.S. PATENT DOCUMENTS

2011/0017411 A1   1/2011   Yeh

FOREIGN PATENT DOCUMENTS

| CN | 101163847 A | 4/2008 | |
|---|---|---|---|
| DE | 20 2011 103494 U1 | 10/2012 | |
| EP | 0976909 A2 | 2/2000 | |
| EP | 2 166 252 A1 | 3/2010 | |
| FR | 1514444 * | 2/1967 | |
| FR | 2429936 A1 * | 1/1980 | ............... F16H 1/30 |
| GB | 1180431 A | 2/1970 | |
| JP | S5028581 B | 9/1975 | |
| JP | S63-167886 | 7/1988 | |
| JP | 2007177405 A | 7/2007 | |
| JP | 2007195284 A | 8/2007 | |
| WO | 2006/107597 A1 | 10/2006 | |
| WO | 2013076256 A2 | 5/2013 | |

OTHER PUBLICATIONS

International Search Report and Written Opinion for corresponding patent application No. PCT/EP2014/068950 dated Oct. 13, 2014.
Mar. 9, 2018 1st non-final Office Action Issued for JP Patent Application No. 2016-541893.
Decision of Rejection in corresponding Japanese Patent Application No. 2016-541893 dated Sep. 21, 2018.

* cited by examiner

TUBULAR ACTUATING MECHANISM FOR ROLL-TYPE CLOSURES

This application is a national phase of International Application No. PCT/EP2014/068950 filed Sep. 5, 2014 and published in the English language.

I. FIELD OF THE INVENTION

The present invention relates to a tubular actuating mechanism for roll-type closures, such as for example roller shutters, roller blinds, solar protection screens, garage doors, home video screens and similar.

II. TECHNICAL BACKGROUND

Tubular actuating mechanisms or devices for reeling and unreeling of roll-type closures are known in the art to provide a compact and convenient means for mechanically driving such closures. The tubular form allows to arrange these mechanisms e.g. inside of the roller of the roll-type closures, whereby a particularly compact packaging is achieved, although the present invention is not limited to this particular application. The tubular actuating mechanisms can be designed to be operated manually, by means of a suitable cord or connecting rod, but they are often provided with electric motors for a convenient motorized reeling and unreeling. The motor driven variant often can be driven manually to allow the actuating of the closure in case of a defect or a power outage. Typically, such tubular actuating mechanisms comprise therefore an electric motor or are adapted to cooperate with such a motor and have a gear reduction assembly, to limit the speed of the electric motor, which is usually much too high for directly reeling or unreeling of the closures. The gear reduction assemblies commonly applied are of the epicyclic gearing type, whereby for most applications three or more stages of such epicyclic gearing is necessary to achieve the desired speed reduction and torque increase.

A typical example of a tubular geared motor for roller blinds is known from the co-owned WO 2010/089243 A2. In this document, a tubular geared motor for roller blinds is disclosed comprising an electric motor and a reduction assembly in form of an epicyclic reduction gear. According to this document, the epicyclic reduction gear has several advantages, namely for example a high reduction ratio, it allows to transmit high torque with at the same time a compact design and a low weight. Further, the output shaft can be subjected to high radial loads. These constructional advantages make such epicyclic reduction gears very useful in roll-type closure applications. However, according to this document, one drawback of such epicyclic gears is that this type of gear tends to amplify the vibrations of the electrical motor and is therefore noisy and transfers vibrations to the surrounding building structure. This drawback is even worsened when several epicyclic reduction gears are arranged in several stages to achieve the desired high reduction ratio. The WO 2010/089243 suggests to reduce these drawbacks by providing an elastic belt between the planet gears and the outer ring gear to damp the occurring vibrations.

From EP 0 976 909 A1 another tubular actuating mechanism for roll-type closures is known, which is again assigned to the same applicant. Also in this document a tubular device is disclosed, comprising an electric motor and several epicyclic reduction gears all arranged in longitudinal direction. This document discloses an improved mechanical irreversibility device, which prevents that the closure to be actuated unreels in uncontrolled way because of its own weight. Instead of the frequently used stop devices in the form of electromagnetic brakes or purely mechanical brakes, the EP 0 976 909 suggests an improved device, which reduces vibrations from the electric motor.

It is an object of the present invention to provide an improved tubular actuating mechanism which offers improved noise and vibration reduction. It is a further object of the present invention to provide such an improved design, which is reliable and compact at the same time, while offering a similar, preferably improved performance over the prior art designs.

These and other objects which will become apparent upon reading the following description are solved by a tubular actuating mechanism for roll-type closures according to claim 1.

III. SUMMARY OF THE INVENTION

According to the present invention, an improved tubular actuating mechanism for roll-type closures, such as roller blinds, roller shutters etc., is provided, which comprises an electric motor and a gear reduction assembly of the epicyclic gearing type comprising a rotatable sun gear, one or more rotatable planet gears and a preferably fixed outer ring gear. According to the invention, the sun gear serves as an input and is preferably directly coupled with the output shaft of the electric motor. Directly coupled in this sense means that no further reduction step is arranged between the sun gear and the electric motor, although of course any necessary coupling means may be provided between the output shaft of the motor and the shaft of the sun gear. Thus, the sun gear preferably rotates in the same speed as the electric motor and interacts with the planet gear(s) to rotate the same. The rotating planet gears are engaged with the preferably fixed outer ring gear. Since the planet gears are supported in a planet carrier, the planet carrier is driven thereby and acts as output member of the system, provided that the outer ring gear is fixed. Alternatively, also the planet carrier could be fixed and the outer ring gear would then serve as output. However, although this alternative is covered by the invention, it is less preferred, since the manufacturing process is more complex. In so far, the above described constructions are similar to the known designs. However, according to the invention, the sun gear of the inventive epicyclic gearing is not a common gear wheel as heretofore used in the art but rather a worm. It was surprisingly found, that by using a worm as sun gear (in the following also denoted as "sun worm") a highly improved actuating mechanism can be achieved, which offers significantly reduced noise and vibration and at the same time high reduction ratios. It was indeed found, that by using a sun-worm and correspondingly adjusted planet gears, a gear reduction assembly can be realized, by means of which the number of gear reduction stages in a tubular actuating mechanism for roll-type closures can be reduced to a minimum, while at the same time vibration and noise is reduced significantly. In comparison with a prior art design employing three standard epicyclic gear stages, a noise reduction of 5 to 6 dB is achieved.

Further, it was found that by choosing a suitable shape of the tooth of the worm and the corresponding teeth of the planets (which act as worm wheels), it is possible to provide said gear reduction assembly with a self-locking function. In other words, the direction of transmission (input shaft versus output shaft) of the inventive design is not reversible, so that only the worm (i.e. the input shaft of the system) can drive the planet gears but not the other way around. In a particularly preferred embodiment, it is therefore possible to provide a tubular actuating mechanism which does not comprise any separate braking devices for preventing unintentional unrolling as it was necessary in the art. Thereby, the amount of (moving) parts in the mechanism can be reduced, whereby again costs can be reduced as well as noise and vibration occurring from these parts.

In a preferred embodiment, the novel gear reduction assembly of the present invention is the first reduction stage of the mechanism coupled to the electric motor. In other words, no further reduction gear, as for example a common epicyclic reduction gear is arranged between the output of the electrical motor and the in particular worm driven gearing of the present invention. In a most preferred embodiment, a suitable construction of the novel gearing allows the omitting of any further gear reduction steps in the mechanism, so that the worm driven gearing of the present invention is the only gear reduction assembly of the mechanism.

Preferably, the one or more planet gear(s) is a helical gear, i.e. the leading edges of the teeth are not parallel to the axis of rotation but are set at an angle.

Generally preferred, the rotational axis of the one or more planet gear(s) is inclined relative to the rotational axis of the sun worm. It has been found, that suitable angles of inclination are between 30° and 90°, preferably between 30° and 75°, more preferably between 35° and 50° and most preferably about 40°. An angle of inclination of about 40° (i.e. 40°+/−3° to allow for manufacturing tolerances) offers the best results in terms of strength, efficiency and sound level.

In a preferred embodiment, the worm shaft is supported rotatably inside the planet carrier. The planet carrier is for example preferably shaped as a drum, whereby a particular compact and yet robust design is achieved. The outer ring gear (i.e. the annulus) in turn is arranged around said planet carrier and can for example be provided in form of a cylinder including inward facing teeth that mesh with the planet gear or gears. Preferably, the outer ring gear is fixed inside a cylindrical housing, either in form of a separate part or being integrally formed inside the cylindrical housing, and the same housing rotatably also supports the planet carrier. Thus, the planet carrier can rotate relative to the cylindrical housing and the outer ring gear (which may be integral with the cylindrical housing).

Generally preferred, the inventive mechanism comprises three planet gears arranged in a 120° configuration around the sun worm. Further preferred, the reduction ratio of said gear reduction assembly is at least 1:15, or preferably at least 1:25 even more preferably at least 1:30 and most preferably at least 1:40.

DESCRIPTION OF THE PREFERRED EMBODIMENTS

In the following, the invention is described exemplarily with reference to the enclosed figures, in which

Figure 1:
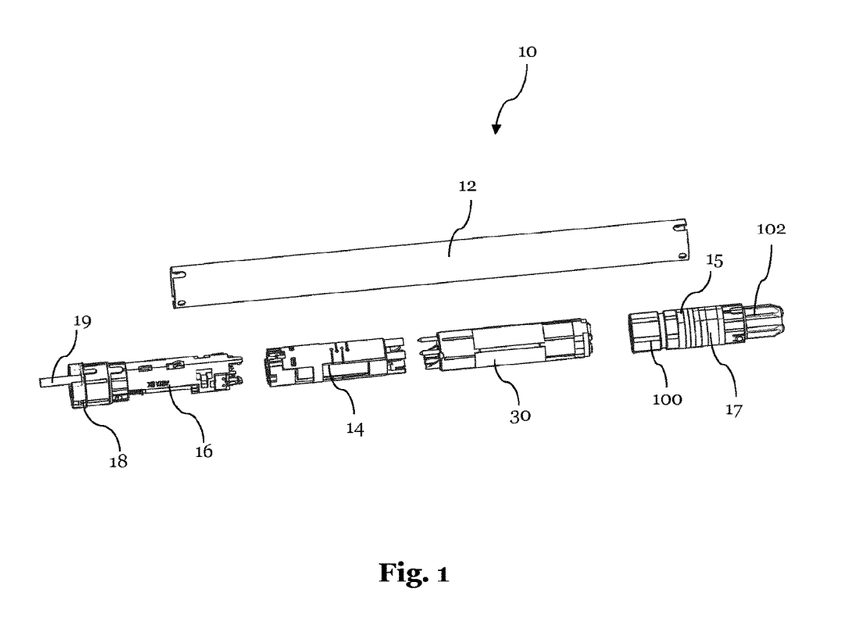
FIG. 1 shows a three dimensional schematic view of a tubular actuating mechanism and auxiliary devices.

FIG. 1 shows a schematic three dimensional view of a tubular actuating mechanism 10 for roll-type closures, such as roller blinds, roller shutters etc.

The electric motor 30 drives the motor shaft in rotation at a relatively high speed in the order of 2800 or 3300 revolutions per minute (rpm), when AC type and of 4000 to 7000 revolutions per minute when DC type. In order to obtain an output speed and torque that can be used at the output shaft of the actuating mechanism to drive a roller blind or similar, a reduction gear assembly is associated with the motor. In typical applications, the reduction gear assembly reduces the speed of the electric motors to 17 to 30 revolutions per minute, so the reduction ratio of the gear assembly has to be very high. Since the commonly used epicyclic gear assemblies cannot technically have a reduction ratio higher than about 1:7 it is necessary to use several such reduction stages, most commonly at least three. This type of gear assembly makes noise and vibration even if aphonic plastic gears are used. The noise comes mainly from the moving elements of the first and second stages in particular from the planet and sun gears and because these reduction stages amplify vibrations coming from the electric motor.

For these reasons, most actuator manufacturers seek to reduce the noise generated by these necessary sub-assemblies. A lot of efforts are directed to the optimization of the known epicyclic gearing by introducing for example suitable materials or a damping means between the different reduction stages. However, it is well known, that the optimizing of the parts of a traditional epicyclic gearing may reduce the sound level to some extent, however it is very difficult to substantially reduce vibration. Therefore, the sound level of the actual motor may be reduced, however in a motorized blind or shutter, vibration is the main cause of noise. Further, the assembly of a multi-stage epicyclic reduction gear is expensive because many different parts have to be combined.

The tubular actuator 10 shown in FIG. 1 therefore comprises a novel reduction gear 100 in accordance with the invention. Coupled to the reduction gear 100, further a brake 15 and one standard epicyclic reduction gear 17 as well as an output shaft 102 is provided. The output shaft 102 is coupled in a known manner with the actual sun shade or roller blind etc. to reel or unreel the shade or blind as desired. In the shown embodiment, the electric motor 30 is directly coupled to the reduction gear 100 and the reduction gear 100 (and the additional standard reduction gear 17) reduces the relatively high speed of the electric motor 30 to provide a suitable rotation speed at output shaft 102. The output shaft 102 drives e.g. a wheel secured to a roller tube in which the actuator may be inserted and around which the screen or blind is rolled up (these elements are not shown). In the depicted embodiment, additionally a capacitor 14 is provided, which in assembled condition is connected to a control module 16. The control module 16 serves for example to switch off the power supply to the electric motor 30, when the screen or blind reaches a particular position and/or when it receives an order from a control point. Further, the control module 16 has an interface 18 for enabling the actuator 10 to be fastened to a support structure. A power cable 19 provides the necessary electric energy. The skilled person will recognize, that the whole assembly can be arranged inside of tube 12. This tube 12 serves as housing of the actuator inside of which the different parts are held. Further, it serves to transmit the torque of the actuator from its output shaft to the head of the actuator itself and then to the building structure where the actuator is fixed. The tube 12 can be inserted into the rolling tube of e.g. the blind and the output shaft of the tubular actuator is fixed thereto in order to drive the blind through the rolling tube.

Figure 2:
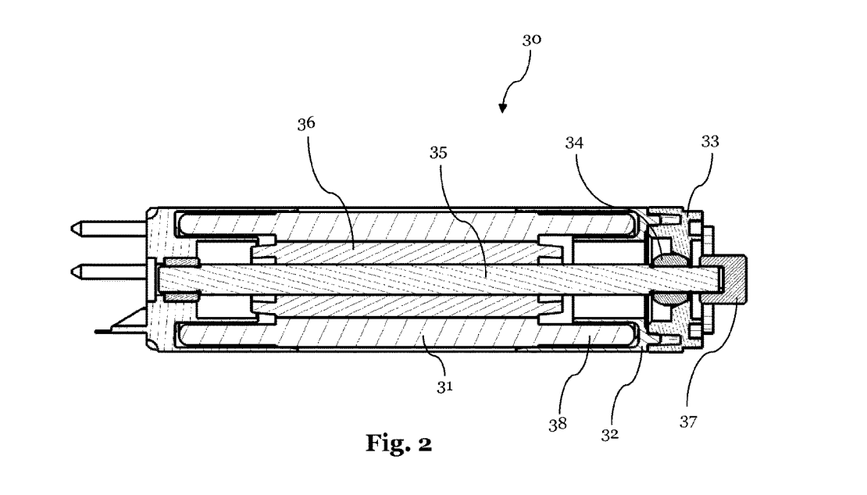
FIG. 2 shows a cross-sectional view of an electric motor.
Figure 3:
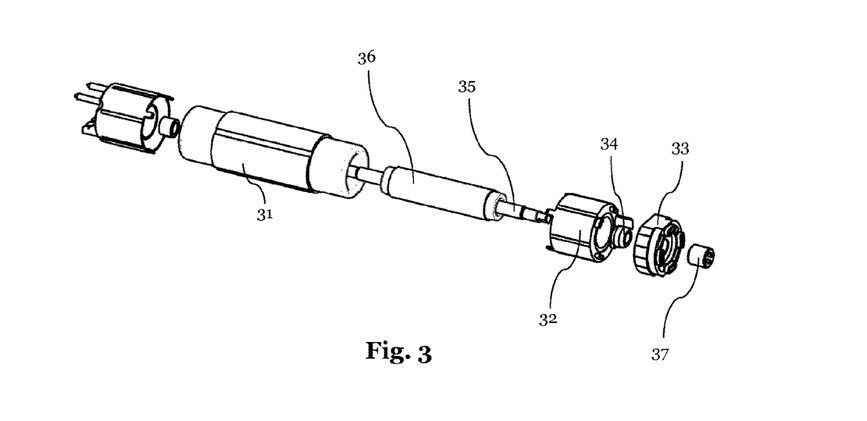
FIG. 3 shows an exploded view of the electric motor of FIG. 2.

FIG. 2 shows a cross-sectional view of the electric motor 30. The electric motor 30 comprises a wound stator 31 with an overhang of wiring 38 inside of a toroidal casing 32. The toroidal casing 32 is inserted into a cup or bowl 33 incorporating a self-lubricating bearing 34 that guides the motor shaft 35 in its rotation. The motor shaft 35 is secured to the rotor 36 of the motor and is driven in rotation by the wound stator 31. Further, an interface part 37, i.e. a coupling, is fastened to one end of the motor shaft 35, in order to couple the motor shaft 35 directly with the worm of the reduction gear 100. In other words, this interface part 37 forms a coupling between the motor 30 and the reduction gear 100. Advantageously, this interface part 37 is made of a damping material, as for example an elastomer, and thereby helps in reducing noise while at the same time allows the transmittance of torque to the reduction gear. Alternatively, the shaft of the electric motor could be machined to receive the worm or the shaft of the electric motor could be integral with the worm. The same elements are shown again in FIG. 3 in an exploded three dimensional view to facilitate understanding.

Figure 4:
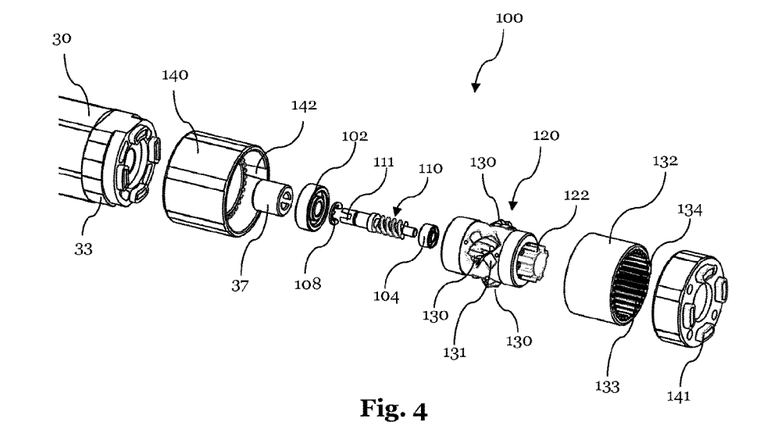
FIG. 4 shows an exploded view of a tubular actuating mechanism in accordance with the invention.

FIG. 4 shows a schematic exploded view of the reduction gear 100 in accordance with the invention. In the shown embodiment, the reduction gear 100 is a tubular member arranged inside of a cylindrical casing 140, 141. The casing is made from two parts but may also comprise more or less parts. Inside of this casing 140, 141 a drum 120 is arranged, which serves as planet carrier for three planet gears 130, that are arranged in a 120° configuration. The planet gears 130 interact with a sun gear, which in accordance with the invention is provided in form of a worm 110. The worm 110 is provided with a worm shaft 111 that is coupled via the coupling 37 directly with the output shaft of the electric motor 30. The worm 110 is arranged rotatable inside of drum 120 by means of a first bearing 102 and a second bearing 104. Element 108 is a seger ring, which serves as assembly element. In assembled condition, the drum 120 is arranged inside of a cylindrical element, namely the outer ring gear 132. This outer ring gear 132 comprises at its inner wall ring teeth 133 that are adapted to interact with the teeth of the planet gears 130.

Figure 5:
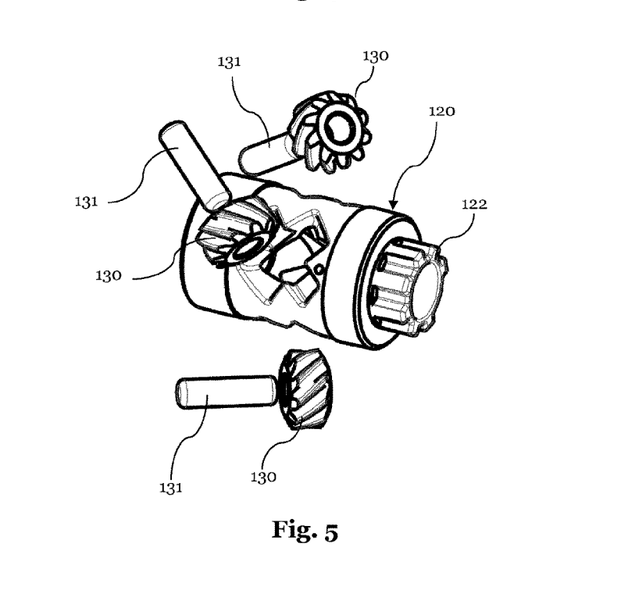
FIG. 5 shows a three dimensional partially exploded view of a gear reduction assembly.

As can be taken from FIG. 4, and in particular from FIG. 5, the planet gears 130 comprise respective shafts 131 by means of which the planet gears 130 are supported rotatably at or in the housing of drum 120. In the shown embodiment, the shafts 131 are separate parts onto which the planet gears 130 are fixed, however, the shafts may also be integrally formed with the planet gears 130 or may have any other suitable configuration. The drum 120 also comprises a coupling 122, for receiving for example a complimentary part of a further reduction stage or for coupling directly with the rotor closure element to be actuated. From FIG. 5 one can see that the shafts 131 of the planet gears 130 are not perpendicular or parallel relative to the longitudinal or rotational axis of the worm 110 but inclined at an angle of about 40°. The planet gears 130 are supported in the wall of drum 120 and the wall of drum 120 comprises corresponding apertures or through holes, so that the teeth of the planet gears 130 can interact with the tooth of the worm 110 being arranged inside of drum 120 and at the same time with the ring teeth 133 of outer ring gear 132.

In operation, the worm 110 rotates with the same speed as the motor shaft 35 and thereby rotates the plant gears 130. Since the outer ring gear 132 is fixed inside of casing 140, the drum 120 (i.e. the planet carrier) will be put into rotation accordingly. The expression "fixed outer ring gear" means e.g. in the context of this invention, that the outer ring gear does not rotate relative to the electric motor 30; only the worm 110 and the drum 120 will rotate relative to the motor 30. The skilled person will recognize, that the drum 120 is a rotatable planet carrier of the epicyclic gearing mechanism comprised of worm 110, the three planet gears 130 and the outer ring gear 132. However, due to the epicyclic configuration of the reduction gear 100, the drum 120—and thus the coupling 122 of the drum—will rotate at a much reduced speed compared to the worm 110, respectively the motor shaft 35. Preferably, the reduction ratio of the shown reduction gear assembly is at least 1:15, m more preferably at least 1:25, even more preferably at least 1:30 and most preferably at least 1:40. Thus, for the most common applications, the present invention only requires one additional reduction stage after the inventive worm-based epicyclic gear instead of three or more stages as in the prior art. Further, since in particular the first reduction stage after the electric motor produces the most noise and vibration, the overall noise and vibration level can be greatly reduced since the inventive worm-based epicyclic gear is used as the first stage.

From FIG. 4 one can further take that the outer ring gear 132 is provided with a key 134 on its outer surface which is adapted to fit inside of keyway 142 provided on the inner walls of casing part 140. Thereby, the outer ring gear 132 is rotationally fixed inside of casing 140. Casing 140 in turn is fixedly mounted (directly or indirectly) to for example a building structure.

Figure 6:
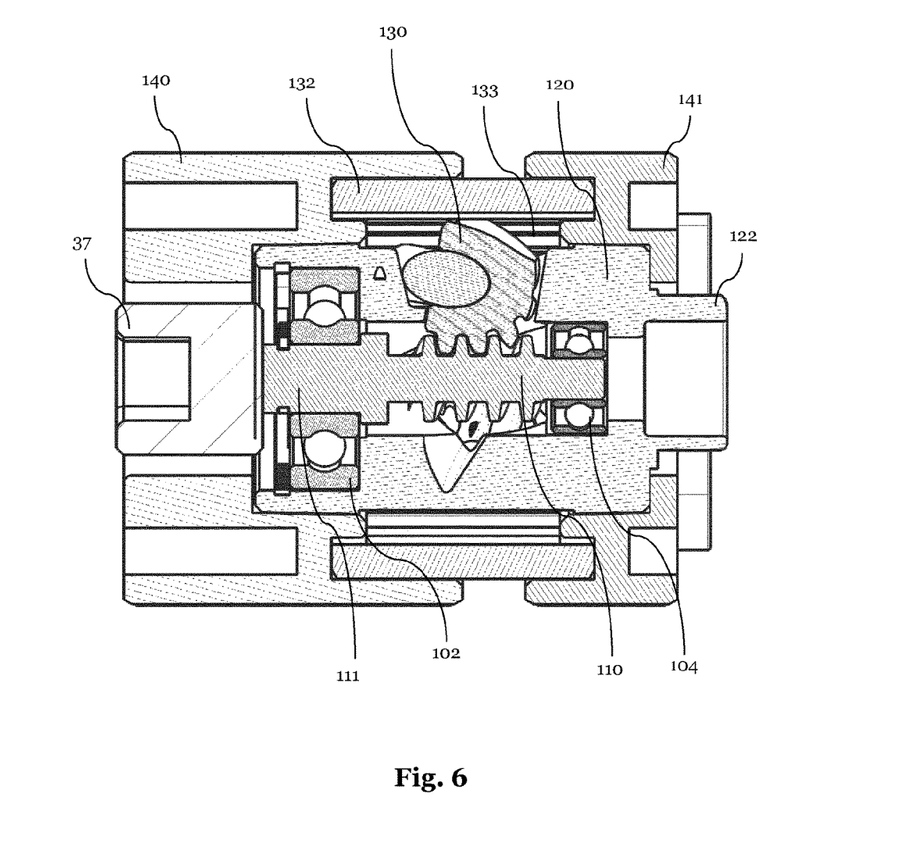
FIG. 6 shows a cross-sectional view of a gear reduction assembly in accordance with the invention.

FIG. 6 shows a cross-sectional view of the gear reduction assembly 100 in assembled condition. As one can take from FIG. 6, the two housing or casing parts 140, 141 enclose the outer ring gear 132 and the outer ring gear 132 in turn encloses the drum 120, i.e. the planet carrier. The worm 110 is coaxially arranged centrally inside of casing 141 and drum 120. From this illustration, one can also clearly see how the planet gears 130 interact with the tooth of the worm 110 and the ring teeth 133 of the outer ring gear 132. When worm 110 rotates, via the direct coupling to motor shaft 35 by means of coupling 37, the planet gears 130 will rotate, and since outer ring gear 132 is rotatably fixed inside of casing 140, 141, the planet gears will rotate drum 120 accordingly with a reduced speed.

The configuration shown thus corresponds to an epicyclic gearing having a sun gear (which is in the present case a worm) and three planet gears attached to a common rotatable planet carrier (the drum 120) and all being arranged inside of an outer ring gear. By driving the worm 110 and keeping the outer ring gear 132 fixed, the drum 120 i.e. the planet carrier, serves as the output of the system. This configuration, i.e. driven sun and fixed outer ring, offers the highest gear reduction ratio possible in such a system and is the best known mode of operation.

TABLE OF REFERENCE SIGNS 10 tubular actuating mechanism
12 tube
14 capacitor
15 brake
16 control module
17 standard epicyclic reduction gear
18 interface
19 power cable
30 electric motor
31 wound stator
32 toroidal casing 33 bowl
34 self-lubricating bearing
35 motor shaft
36 rotor
37 coupling
38 overhang of wiring
100 reduction gear
102 first bearing
104 second bearing
108 seger ring
110 worm
111 worm shaft
120 drum (planet carrier)
122 coupling
130 planet gears
131 planet gear shafts
132 outer ring gear
133 ring teeth (of outer ring)
134 key
140 casing part
141 casing part
142 keyway In the following preferred embodiments are described to facilitate a deeper understanding of the invention:

1. Tubular actuating mechanism (10) for roll-type closures, comprising an electric motor (30) and a gear reduction assembly (100) of the epicyclic gearing type comprising a rotatable sun gear (110), one or more rotatable planet gear(s) (130) and an outer ring gear (132), characterized in that said sun gear (110) is a worm and said one or more planet gear(s) (130) interact(s) with the outer ring (132) and turn(s) to around a shaft (131) that is supported in a rotatable planet carrier (120), thereby driving said planet carrier.

2. The tubular actuating mechanism of embodiment 1, characterized in that said gear reduction assembly (100) is the first reduction stage of the mechanism coupled to the electric motor (30) and is preferably the only gear reduction assembly of the mechanism.

3. The tubular actuating mechanism of embodiment 1 or 2, characterized in that said one or more planet gear(s) (130) is a helical gear.

4. The tubular actuating mechanism of any of the preceding embodiments, characterized in that the rotational axis of the one or more planet gear(s) (130) is inclined to the rotational axis of the sun worm (110).

5. The tubular actuating mechanism of the preceding embodiment, characterized in that the angle of inclination is between 30 and 90 degree, preferably between 30 and 75 degree, more preferably between 35 and 50 degree and most preferably about 40 degree.

6. The tubular actuating mechanism of any of the preceding embodiments, characterized in that said sun worm (110) and said planet gear(s) (130) are adapted to be self-locking.

7. The tubular actuating mechanism of the preceding embodiment, characterized in that the mechanism does further comprise a breaking device for preventing unintentional unrolling.

8. The tubular actuating mechanism of any of the preceding embodiments, characterized in that the worm shaft (111) is supported rotatably in or at the planet carrier (120).

9. The tubular actuating mechanism of any of the preceding embodiments, characterized in that the worm shaft (111) is functionally directly coupled with the output shaft (35) of the electric motor (30).

10. The tubular actuating mechanism of any of the preceding embodiments, characterized in that the outer ring gear (132) is fixed inside a cylindrical housing (140, 141) and said housing rotatably supports the planet carrier (120).

11. The tubular actuating mechanism of any of the preceding embodiments, characterized in that the planet carrier (120) is a drum and is arranged inside said cylindrical housing (140, 141).

12. The tubular actuating mechanism of any of the preceding embodiments, characterized in that the mechanism comprises three planet gears (130) arranged in a 120° configuration around the sun worm (110).

13. The tubular actuating mechanism of any of the preceding embodiments, characterized in that the reduction ratio of said gear reduction assembly (100) is at least 1:15, more preferably at least 1:25, even more preferably at least 1:30 and most preferably at least 1:50.

14. The tubular actuating mechanism of any of the preceding embodiments, characterized in that the tubular actuating mechanism (10) is designed to be arranged inside the roller of a roll-type closure.

15. The tubular actuating mechanism of any of the preceding embodiments, characterized in that the outer ring gear (132) is fixed.

The invention claimed is:

1. A tubular actuating mechanism for roll-type closures, comprising an electric motor and a gear reduction assembly of the epicyclic gearing type comprising a rotatable sun gear, one or more rotatable planet gear(s) and an outer ring gear, wherein said sun gear is a worm and a worm shaft is supported rotatably in a planet carrier and said one or more planet gear(s) interact(s) with the outer ring and turn(s) around a shaft that is supported in the rotatable planet carrier, thereby driving said planet carrier, and said gear reduction assembly is the first reduction stage of the mechanism coupled to the electric motor wherein said one or more planet gear(s) is a helical worm gear.

2. The tubular actuating mechanism of claim 1, wherein said gear reduction assembly is the only gear reduction assembly of the mechanism.

3. The tubular actuating mechanism of claim 1, wherein said one or more planet gear(s) is a helical gear.

4. The tubular actuating mechanism of claim 1, wherein the rotational axis of the one or more planet gear(s) is inclined to the rotational axis of the worm.

5. The tubular actuating mechanism of claim 4, wherein an angle of inclination is between 30 and 90 degrees.

6. The tubular actuating mechanism of claim 1, wherein said worm and said planet gear(s) are adapted to be self-locking.

7. The tubular actuating mechanism of claim 6, wherein the mechanism further includes a brake for preventing unintentional unrolling of a roll-type closure.

8. The tubular actuating mechanism of claim 1, wherein the worm shaft is functionally directly coupled with an output shaft of the electric motor.

9. The tubular actuating mechanism of claim 1, wherein the outer ring gear is fixed inside a cylindrical housing and said housing rotatably supports the planet carrier.

10. The tubular actuating mechanism of claim 9, wherein the planet carrier is a drum and is arranged inside the cylindrical housing.

11. The tubular actuating mechanism of claim 1, wherein the mechanism includes three planet gears arranged in a 120° configuration around the worm.

12. The tubular actuating mechanism of claim 1, wherein a reduction ratio of said gear reduction assembly is at least 1:15.

13. The tubular actuating mechanism of claim 1, wherein the tubular actuating mechanism is designed to be arranged inside a roller of a roll-type closure.

14. The tubular actuating mechanism of claim 1, wherein the outer ring gear is fixed.

* * * * *